United States Patent
Sayegh

Patent Number: 5,946,602
Date of Patent: *Aug. 31, 1999

[54] REDUCTION OF QUEUING DELAYS BY MULTIPLE SUBGROUP ASSIGNMENTS

[75] Inventor: Soheil Sayegh, Gaithersburg, Md.

[73] Assignee: Comsat Corporation, Bethesda, Md.

[*] Notice: This patent issued on a continued prosecution application filed under 37 CFR 1.53(d), and is subject to the twenty year patent term provisions of 35 U.S.C. 154(a)(2).

[21] Appl. No.: 08/630,346

[22] Filed: Apr. 11, 1996

[51] Int. Cl.$^6$ .......................... H04B 7/185; H04M 11/10
[52] U.S. Cl. .................. 455/12.1; 455/412; 455/561; 370/412
[58] Field of Search ................ 370/412; 455/8, 455/12.1, 38.3, 54.1, 54.2, 58.2, 343, 458, 426, 517, 561, 524, 38.1, 412; 340/825.44

[56] References Cited

U.S. PATENT DOCUMENTS

| | | |
|---|---|---|
| 5,018,136 | 5/1991 | Gollub ..................................... 370/471 |
| 5,146,214 | 9/1992 | Yamada et al. .......................... 455/524 |
| 5,239,668 | 8/1993 | Davis . |
| 5,274,843 | 12/1993 | Murai et al. . |
| 5,317,562 | 5/1994 | Nardin et al. . |
| 5,392,287 | 2/1995 | Tiedemann, Jr. et al. . |
| 5,392,457 | 2/1995 | Davis et al. . |
| 5,430,732 | 7/1995 | Lee et al. . |
| 5,440,299 | 8/1995 | Schwendeman ........................ 455/38.3 |
| 5,495,479 | 2/1996 | Galaand et al. ......................... 370/404 |
| 5,581,245 | 12/1996 | Nozaki .................................... 370/412 |

*Primary Examiner*—Nguyen Vo
*Attorney, Agent, or Firm*—Sughrue, Mion, Zinn, Macpeak & Seas, PLLC

[57] ABSTRACT

In a satellite communication system including mobile communication devices, in which each of the mobile communication devices is associated with one of a plurality of groups, a method is provided for allocating those devices. According to the method, each of the groups of mobile communication devices is first partitioned into subgroups, each of the subgroups having a queue associated therewith. Subsequently, each of the mobile communication devices is assigned to more than one subgroup having a queue corresponding thereto so as to reduce queuing delays associated with the satellite communication system. In another embodiment, a message to be received by one of the mobile communication devices is transferred to the shorter of the queues corresponding to those subgroups to which the mobile communication device has been assigned.

4 Claims, 5 Drawing Sheets

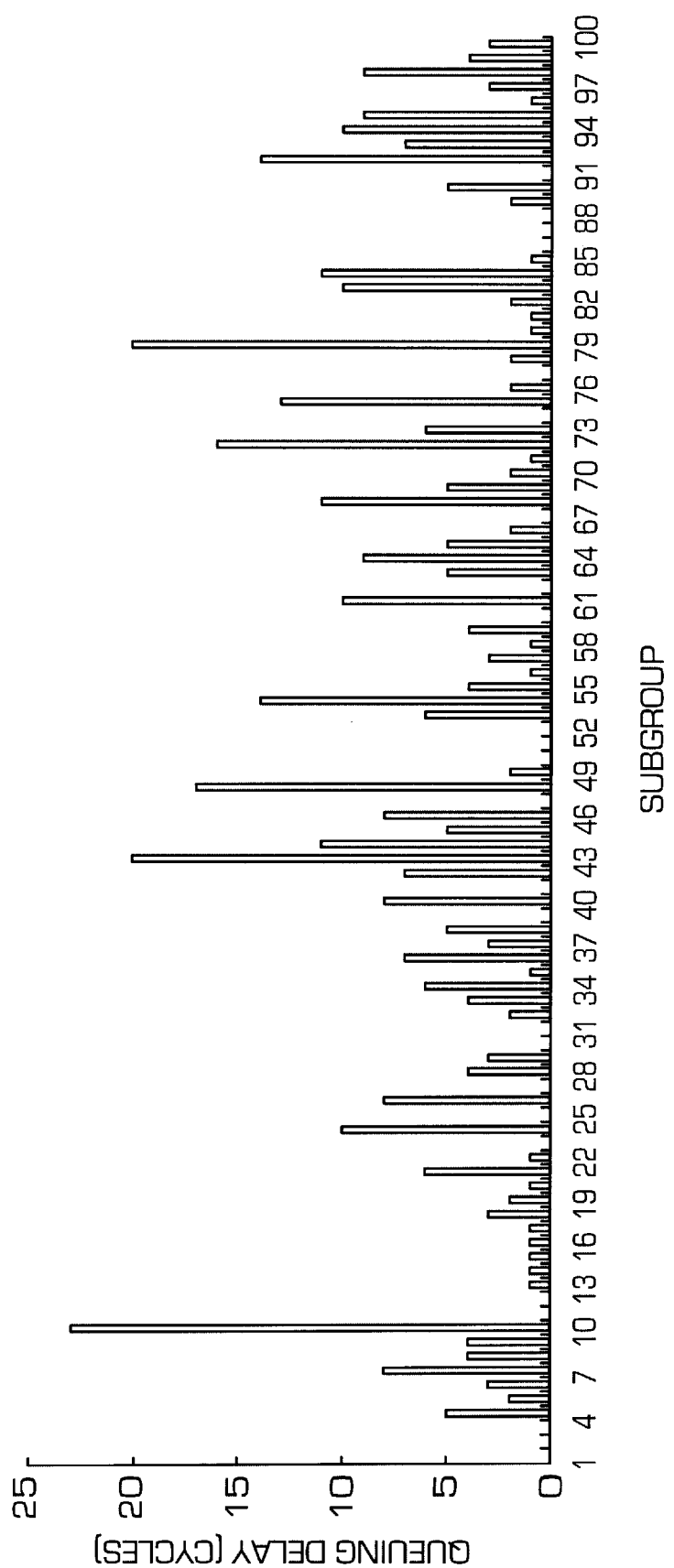

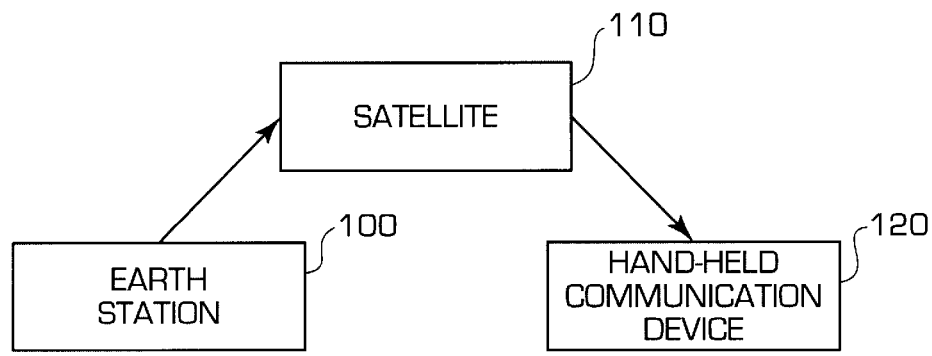
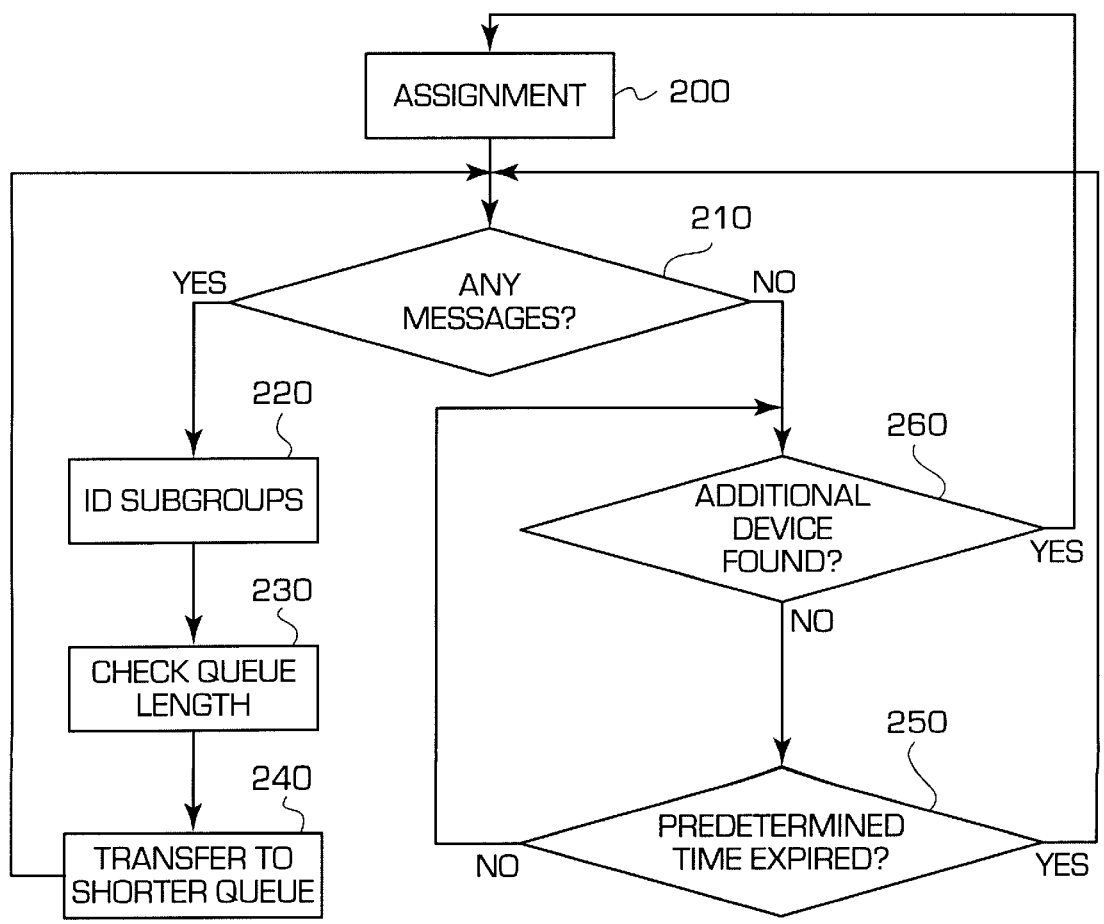

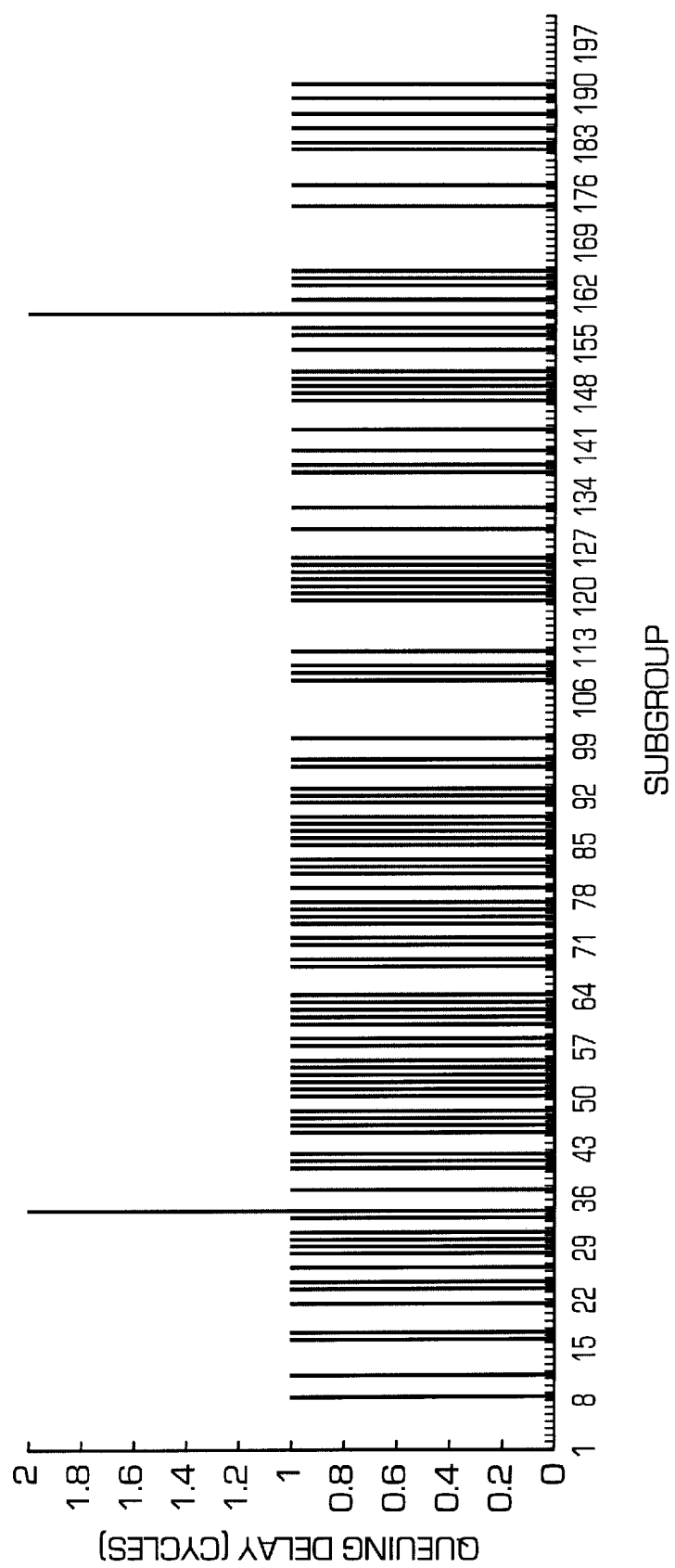

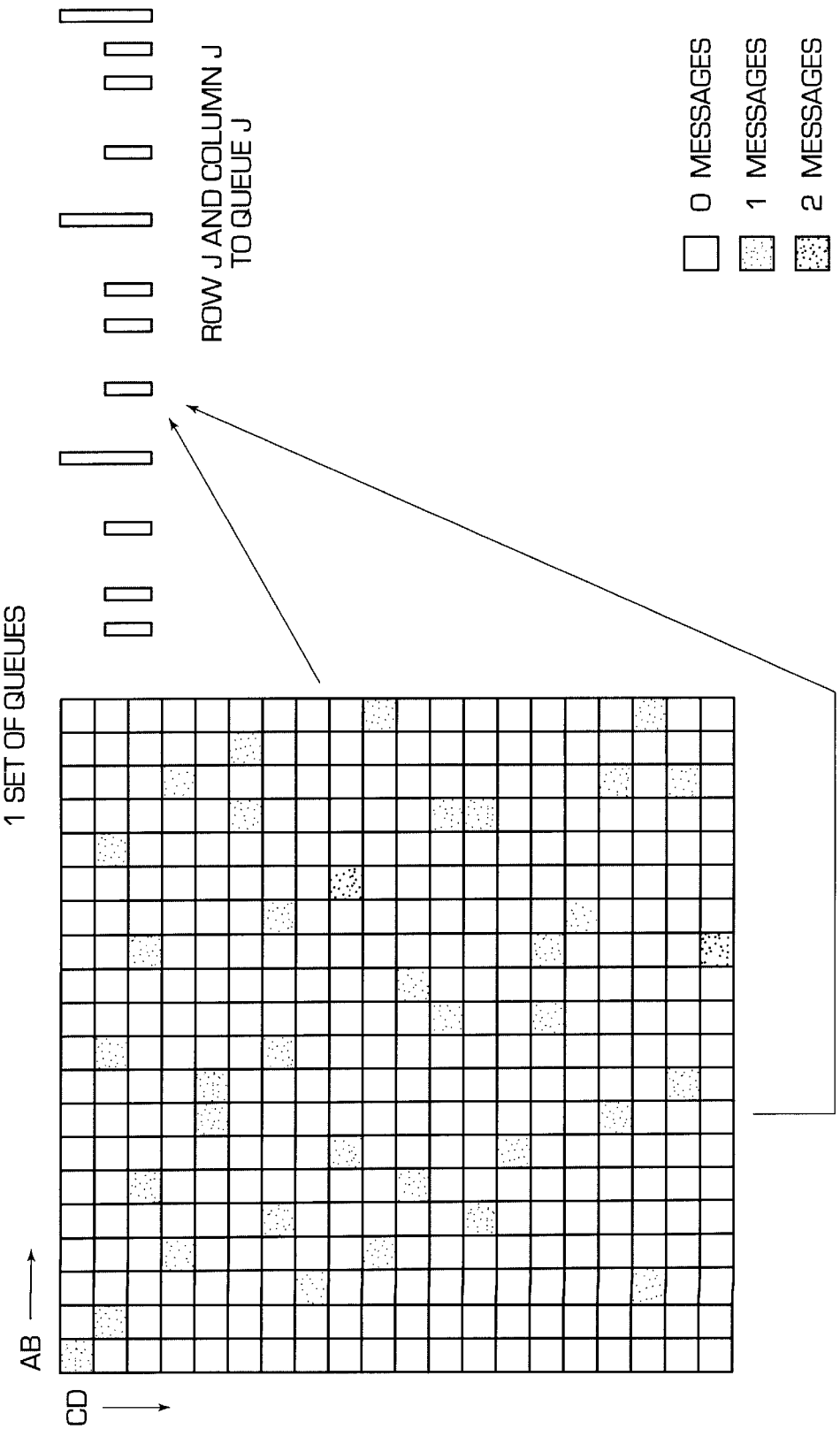

REDUCTION OF QUEUING DELAYS BY MULTIPLE SUBGROUP ASSIGNMENTS

BACKGROUND OF THE INVENTION

The present invention relates to satellite communication systems employing mobile or hand-held communication devices such as Inmarsat-P, Iridium, Globalstar, and Odyssey. In these systems, there is a need to transmit signals to a hand-held communication device on a regular basis for signaling, synchronization, paging, and short message delivery.

One constraint placed on satellite communication with hand-held communication devices is the fact that they must be turned on in order to receive any messages.

Each hand-held communication device should have a sleep/wake cycle with short wake intervals between is long sleep intervals so that the duty factor is kept small in order to conserve battery power. To this end, hand-held communication devices are divided into subgroups with each device being assigned to only one subgroup. The duty factor is kept small if a large number of subgroups are employed and the hand-held communication devices belonging to each subgroup wake at only specified intervals.

One problem with the conventional method in which each hand-held communication device is assigned to only one subgroup is that the queuing delay caused by statistical fluctuations in the traffic to the different subgroups increases as the number of subgroups increases. Thus, with the conventional method of assigning hand-held communication devices, the queuing delay corresponding to a given throughput can be great when a large number of subgroups are employed in a satellite communication system.

SUMMARY OF THE INVENTION

An object of the present invention is to reduce the queuing delays in a satellite communication system corresponding to a given throughput. To that end, in a satellite communication system including a plurality of mobile communication devices in which each of the mobile communication devices are associated with one of a plurality of groups, a method is provided according to a first embodiment of the present invention of allocating mobile communication devices. The method includes the steps of partitioning each of the groups of mobile communication devices into subgroups, each of the subgroups having a queue associated therewith, and assigning each of the mobile communication devices to more than one of the subgroups so as to reduce queuing delays associated with the satellite communication system.

According to the first embodiment of the invention, the method further comprises the step of transferring a message to be received by one of the mobile communication devices to a shorter queue corresponding to those subgroups to which the one of the mobile communication devices has been assigned.

According to a second embodiment of the invention, each of the mobile communication devices is assigned to more than one subgroup according to at least two pre-determined parameters, wherein there is at least one subgroup associated with each of the parameters.

According to a third embodiment of the invention, each of the mobile communication devices is assigned to more than one subgroup according to at least two predetermined parameters, wherein there are at least two subgroups associated with each of the parameters which share at least two queues with the subgroups associated with at least one other of said parameters.

According to the third embodiment of the invention, the method further comprises the step of transferring a message to be received by one of the mobile communication devices to a shorter queue corresponding to the subgroups to which the one of the mobile communication devices has been assigned.

The advantage of the invention lies in the reduced queuing delays which can be achieved at a given throughput as compared to the queuing delays which result when the conventional method is employed.

BRIEF DESCRIPTION OF THE DRAWINGS

These and other features, aspects and advantages of the present invention will become better understood with reference to the following detailed description, appended claims, and accompanying drawings, in which FIG. 1 is a computer simulated queuing-delay profile of a system operating at 90 percent of maximum throughput which employs 100 subgroups with one subgroup assignment per hand-held communication device.

FIG. 2 shows a satellite communication system including an earth station, satellite, and a hand-held communication device.

FIG. 3 is a flow-chart diagram depicting an example of a method incorporating the invention.

FIG. 5 is a computer simulated queuing-delay profile of a system operating at 90 percent of maximum throughput which employs 200 user subgroups with each hand-held communication device being assigned to two subgroups.

FIG. 6 is a diagram showing a distribution of hand-held communication devices among subgroups in which each hand-held communication device is assigned to two subgroups belonging to two separate classes of subgroups. However, there is only one set of queues associated with the two separate classes of subgroups.

DETAILED DESCRIPTION OF THE INVENTION

Figure 4:
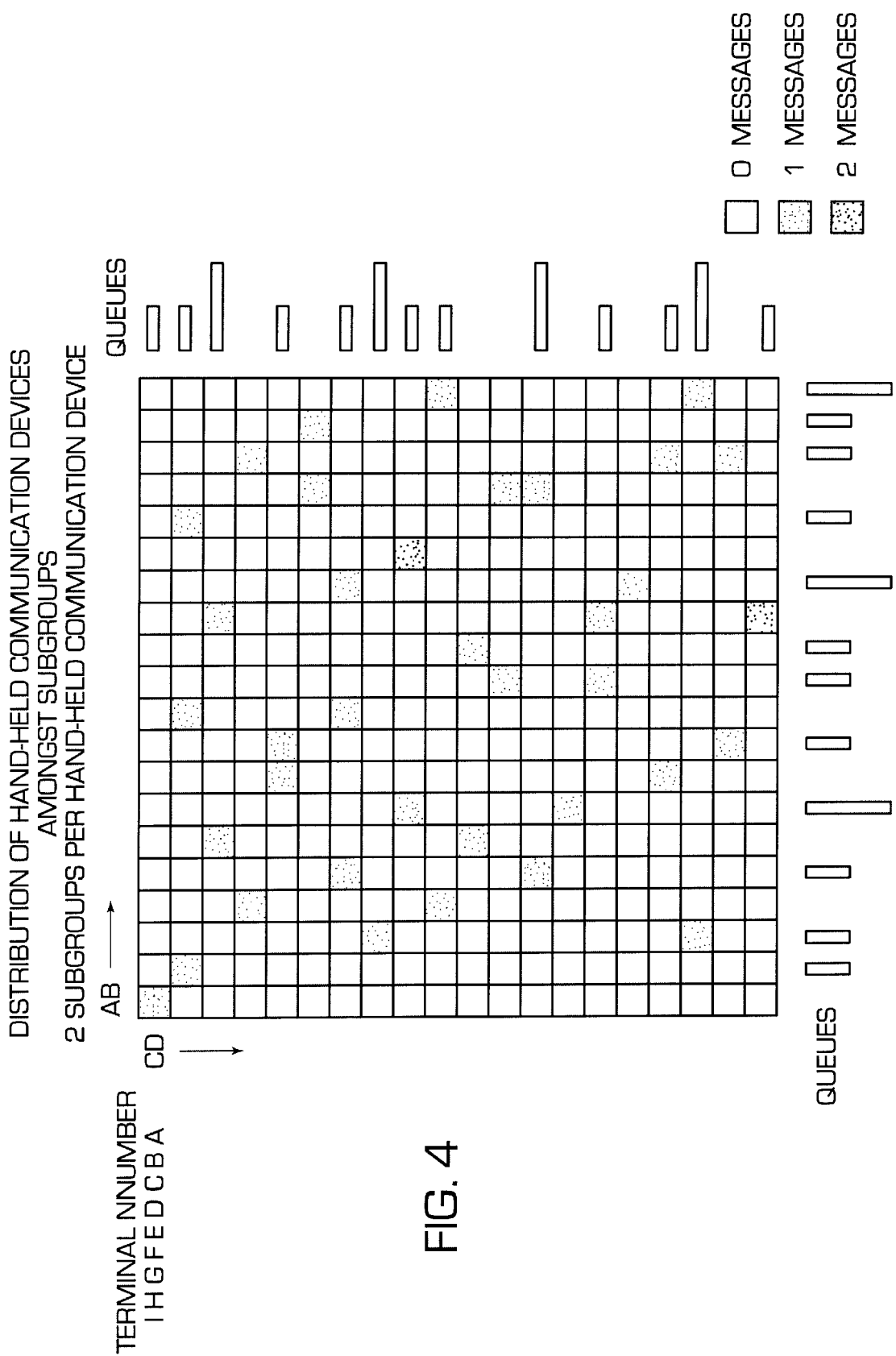
FIG. 4 is a diagram showing a distribution of hand-held communication devices among subgroups, each hand-held communication device being assigned to two subgroups. There are two sets of queues corresponding to the subgroups with each subgroup being represented by a particular row and column in the diagram.

The present invention is a method of allocating hand-held or mobile communication devices which are employed in satellite communication systems comprising the step of assigning each of the hand-held or mobile communication devices to more than one subgroup, each subgroup having a queue associated therewith. Preferably the allocation of communication devices can be accomplished in a pseudo-random fashion.

Computer simulations illustrate the throughput vs. queuing delay characteristics of a satellite system employing both a conventional method and a method according to the present invention. FIG. 1 illustrates a computer simulated queuing delay profile of a satellite system operating at 90 percent of maximum throughput using a conventional method with 100 subgroups and one subgroup assignment per hand-held communication device.

As shown in FIG. 1, delays of more than 20 cycles can be expected when using the conventional method. The duration of each cycle is the product of the number of subgroups and the dwell time in each subgroup. Thus, if for example, the dwell time in each subgroup is 100 msec, the cycle duration is 10 seconds for a hundred subgroups and 20 seconds for two-hundred subgroups.

In FIG. 2 a user's hand-held communication device 120 is programmed to wake during predetermined times assigned to each subgroup to which the hand-held communication device 120 belongs in order to receive messages. The messages are transmitted to the hand-held communication device 120 from an earth station 100 via a satellite 110. The messages may be queued at either the earth station 100 or the satellite 110. Those of skill in the art will appreciate that there can be two-way communication between the earth station 100 and the hand-held communication 120 via the satellite 110.

A message intended for a particular hand-held communication device may be delivered during any time slot in which the device is awake. The time slot having the smallest backlog (i.e. queue) may be selected for delivering a message. The effectiveness of this operation is illustrated by computer simulations which are described below.

FIG. 3 depicts a flow diagram of a method according to the present invention. In an assignment step 200, each hand-held communication device belonging to a group of hand-held communication devices is assigned by a computer to two or more subgroups. For example, a hand-held communication device belonging to a particular user of record may be assigned to a first and second subgroup based upon the first letter of that user's first and last name, respectively. The computer may be employed in an earth station or on board a satellite.

In a determination step 210 which follows the assignment step 200, a computer determines whether there is a message to be sent to one of the hand-held communication devices via a satellite transmission beam. If there are no messages for any of the hand-held communication devices, the computer performs a device monitor step 250, during which the computer waits for a predetermined period of time in a time check step 260 to see if there are any additional hand-held communication devices which have been added to the satellite communication system that need to be assigned to subgroups.

After a predetermined period of time, if there are no additional hand-held communication devices which need to be assigned to subgroups, then the computer performs the determination step 210 again.

If during the determination step 210 there is a message which needs to be sent to a particular hand-held communication device, then the computer will perform a subgroup identification step 220 by identifying the subgroups associated with that hand-held communication device. Once the subgroups which correspond to the hand-held communication device are identified, the computer performs a queue length check step 230 by checking the length of the queues associated with each subgroup to which the hand-held communication device has been assigned. Using the example discussed above, if the user of record's name was John Doe, the hand-held communication device would be assigned to subgroups J and D, respectively. Therefore, the computer would check the lengths of the queues corresponding to subgroups J and D.

After the queue length check step 230 is completed, the computer performs the transfer step 240. In the transfer step 240 the message destined for a hand-held communication device is transferred to the queue having the shorter length. Messages are queued either at the earth station or satellite. In the example described above, the computer would check to see which one of the queues corresponding to the subgroups J or D was shorter.

Once the message is successfully transferred to the shorter of the two queues in the transfer step 240, the computer performs the determination step 210 again to see if there are any additional messages to be transferred to a particular hand-held communication device.

Using a method according to the present invention can improve upon the throughput vs. delay characteristics discussed above in connection with the use of the conventional method. The improvement is evident when each hand-held communication device is assigned to more than one subgroup. For example, the hand-held communication devices may be divided among one set of 100 subgroups based on some pseudo-random assignment scheme.

The hand-held communication devices are also assigned to another set of 100 subgroups based on another pseudo-random assignment scheme. Rather than being assigned to subgroups based on a pseudo-random assignment scheme, the hand-held communication devices may be assigned to subgroups based on some other parameter which is related to a particular characteristic of the user population.

FIG. 4 shows two sets of queues that are formed for two corresponding sets of subgroups. One set of queues is referred to as the "horizontal" set while the other set of queues is referred to as the "vertical" set. A message belonging to row i, which represents a subgroup in one set of subgroups, and column j, which represents a subgroup in another set of subgroups, is assigned to the shorter of horizontal queue i and vertical queue j. A random selection can be made, however, if the two queues are of equal length.

FIG. 5 illustrates a computer simulated queuing-delay profile of a system operating at 90 percent of the maximum throughput in which each hand-held communication device is assigned to two of two-hundred subgroups in the manner discussed above.

A dramatic improvement in the throughput vs. delay characteristics of a system can be observed when contrasting the results shown in FIG. 5 using a method of the present invention with those corresponding to a conventional method, as presented in FIG. 1.

A variation on the method described above is illustrated in FIG. 6 in which only one set of queues is formed for the two sets of subgroups. Both the subgroups corresponding to row j, which represents a subgroup in one set of subgroups, and column j, which represents a subgroup in another set of subgroups, are assigned to queue j. A message belonging to row i and column j is still assigned to the shorter of queue i and queue j. However, the cycle duration is now only half as long since there is only one set of queues.

The price paid for reducing the queuing delay is that each hand-held communication device must now wake up twice as often. Thus, the battery savings achieved with the method employing a single subgroup assignment is not as great as the method employing two subgroup assignments per hand-held communication devices.

Although certain preferred embodiments of the present invention have been described, the spirit and scope of the invention is by no means restricted to what is described above. For example, each hand-held communication device may be assigned to more than two subgroups without departing from the scope of the present invention.

What is claimed is:

1. In a satellite communication system comprising a plurality of mobile communication devices, each of said mobile communication devices being associated with one of a plurality of groups, a method of allocating said mobile communication devices, the method comprising the steps of:

partitioning each of said groups of mobile communication devices into subgroups, each of said subgroups having a queue associated therewith;

assigning each of said mobile communication devices to more than one of said subgroups at a time so as to reduce queuing delays associated with said satellite communication system; and transferring a message intended for receipt by said each of said mobile communication devices to a shorter queue among queues corresponding to said more than one of said subgroups to which said each of said mobile communication devices has been assigned, wherein said assigning of each of said mobile communication devices to more than one of said subgroups is done according to at least two pre-determined parameters, and wherein at least one of said subgroups is associated with each of said parameters.

2. The method defined in claim 1, further comprising the step of transferring a message to be received by one of said mobile communication devices to a shortest queue corresponding to subgroups to which said one of said mobile communication devices has been assigned.

3. The method defined in claim 1, wherein, when queues corresponding to subgroups to which one of said mobile communication devices is assigned are of equal length, the step of transferring comprises transferring the message randomly to one of said queues.

4. The method defined in claim 1, wherein there are at least two subgroups associated with each of said parameters which share at least two queues with the subgroups associated with at least one other of said parameters.

* * * * *